United States Patent [19]
Hodson et al.

[11] Patent Number: 5,162,725
[45] Date of Patent: Nov. 10, 1992

[54] MODULAR METERING INSTRUMENT INCLUDING MULTIPLE SENSING PROBES

[75] Inventors: Price R. Hodson, Glen Ellyn; James W. Oram, Lombard; Paul F. Haake, Highland Park, all of Ill.

[73] Assignee: Alnor Instrument Company, Skokie, Ill.

[21] Appl. No.: 750,445

[22] Filed: Aug. 20, 1991

Related U.S. Application Data

[63] Continuation of Ser. No. 396,985, Aug. 21, 1989, abandoned.

[51] Int. Cl.5 .................... G01R 31/02; G01R 15/08
[52] U.S. Cl. ............................. 324/115; 324/103 R; 324/158 P; 364/550
[58] Field of Search .............. 324/158 P, 114, 115, 324/72.5, 132, 127; 374/181, 183; 364/556, 557, 571.01, 573; 73/620

[56] References Cited

U.S. PATENT DOCUMENTS

| | | | |
|---|---|---|---|
| 2,836,793 | 1/1954 | Kelly | 324/115 |
| 3,619,776 | 11/1971 | Kinninger | 324/115 |
| 3,946,613 | 3/1976 | Silver | 374/183 |
| 4,121,574 | 10/1978 | Lester | 364/557 |
| 4,254,375 | 3/1981 | Matsuoka | 324/115 |
| 4,537,516 | 8/1985 | Epstein | 374/181 |
| 4,608,532 | 8/1986 | Ibar et al. | 324/115 |
| 4,634,292 | 1/1987 | Ikeda et al. | 364/557 |
| 4,642,785 | 2/1987 | Packard et al. | 364/557 |
| 4,672,306 | 6/1987 | Thong | 364/550 |
| 4,748,404 | 5/1988 | Heinze et al. | 324/115 |
| 4,796,027 | 1/1989 | Smith Vaniz | 324/127 |
| 4,840,066 | 6/1989 | Botsco et al. | 73/620 |
| 4,963,820 | 10/1990 | Medlin | 324/142 |

Primary Examiner—Vinh Nguyen
Attorney, Agent, or Firm—Silverman, Cass & Singer, Ltd.

[57] ABSTRACT

A modular metering instrument including one of a plurality of sensing probes or probe modules including identification and calibration information stored therein and a meter module which can identify the sensing probe when the sensing probe is connected thereto. The storage of calibration and identification information in the sensing probe allows the meter module to be utilized with any one of a number of sensing probes to sense different physical parameters. The sensing probe includes at least one sensor and related circuitry to generate a signal relating to the sensed parameter. The meter module analyzes and calibrates the signal and displays the measured parameter.

27 Claims, 5 Drawing Sheets

MODULAR METERING INSTRUMENT INCLUDING MULTIPLE SENSING PROBES

This is a continuation of application Ser. No. 07/396,985 filed Aug. 21, 1989, now abandoned.

BACKGROUND OF THE INVENTION

The invention relates generally to a measuring system for measuring any number of physical parameters and more particularly to a modular metering instrument having a meter module to which can be attached a variety of detachable sensing probes.

A plurality of physical parameters, such as fluid temperature, velocity, pressure, volume flow and humidity can be measured with a conventional meter and the appropriate sensing probes. In the prior art systems and techniques, each time a parameter was to be measured, a new design for an entire metering system including the sensor or sensing probe was required. These techniques are both cumbersome and inefficient.

The utilization of multiple probes with a common meter is not common in measurements such as thermal anemometry, since it is very difficult to obtain acceptable calibration accuracy. Generally it is very difficult to manufacture such sensing probes exactly alike, therefore the calibration curve of each probe is significantly different.

One technique to achieve the utilization of multiple probes with a common meter is to manufacture the probes with great care so that the probes essentially are identical. With such a technique, a common field practice is then to utilize multiple scales for analog instruments or large calibration look up tables for digital instruments. If the probes are not closely matched during manufacture, such calibration tables will be significantly different between probes. The prior systems store the large calibration tables in the meter electronics. This technique complicates the utilization of multiple probes.

It thus would be desirable to provide a modular metering instrument adapted to be attached to a variety of sensing probes, which probes are not manufactured exactly alike without affecting the calibration of the modular metering instrument.

SUMMARY OF THE INVENTION

The disadvantages of the prior art multiple probe systems and techniques are overcome in accordance with the present invention by providing a modular metering instrument having a meter module which can recognize the sensing probe attached thereto and which sensing probe has the calibration information stored therein.

The meter module includes a process for reading the calibration information as well as the sensed parameter and a display for visually indicating desired information as well as the magnitude of the sensed parameter. The sensing probe includes one or more sensors and a memory for storing the identity of the sensing probe and the calibration information relating thereto. The memory and relating sensing circuitry of the sensing probe can be contained in a probe handle, which can be attached directly to the probe and by flexible cables to the meter module. The memory and related sensing circuitry of the sensing probe also could be contained in a connector, connecting the flexible cable to the meter module and the probe then can be a conventional telescoping probe.

DESCRIPTION OF THE PREFERRED EMBODIMENT

Figure 1:
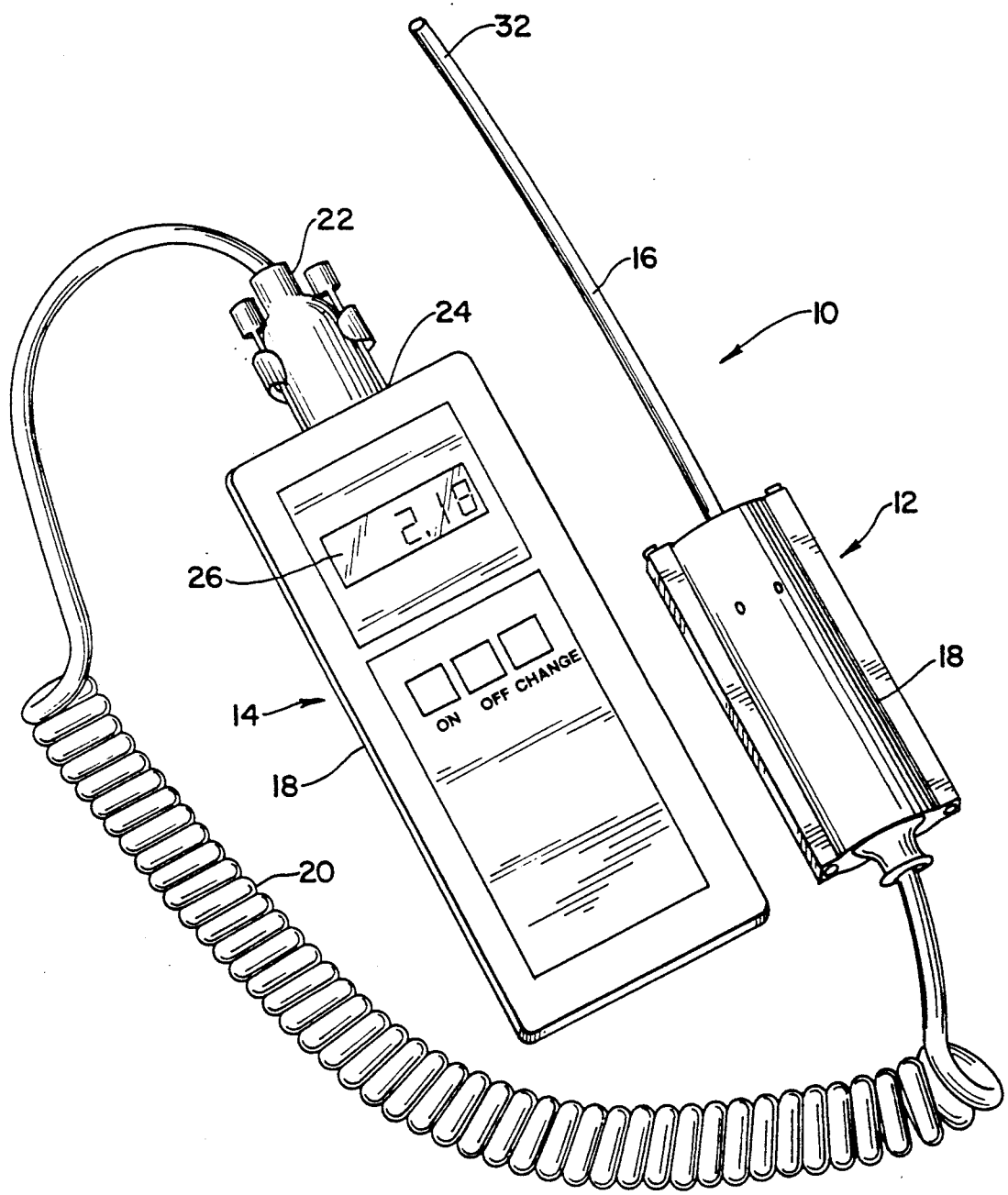
FIG. 1 is a partial perspective view of the modular metering instrument of the present invention.

Referring to FIG. 1, a modular metering instrument of the present invention is designated generally by the reference numeral 10. The modular metering instrument 10 includes a probe module 12 and a meter module 14.

Figure 5:
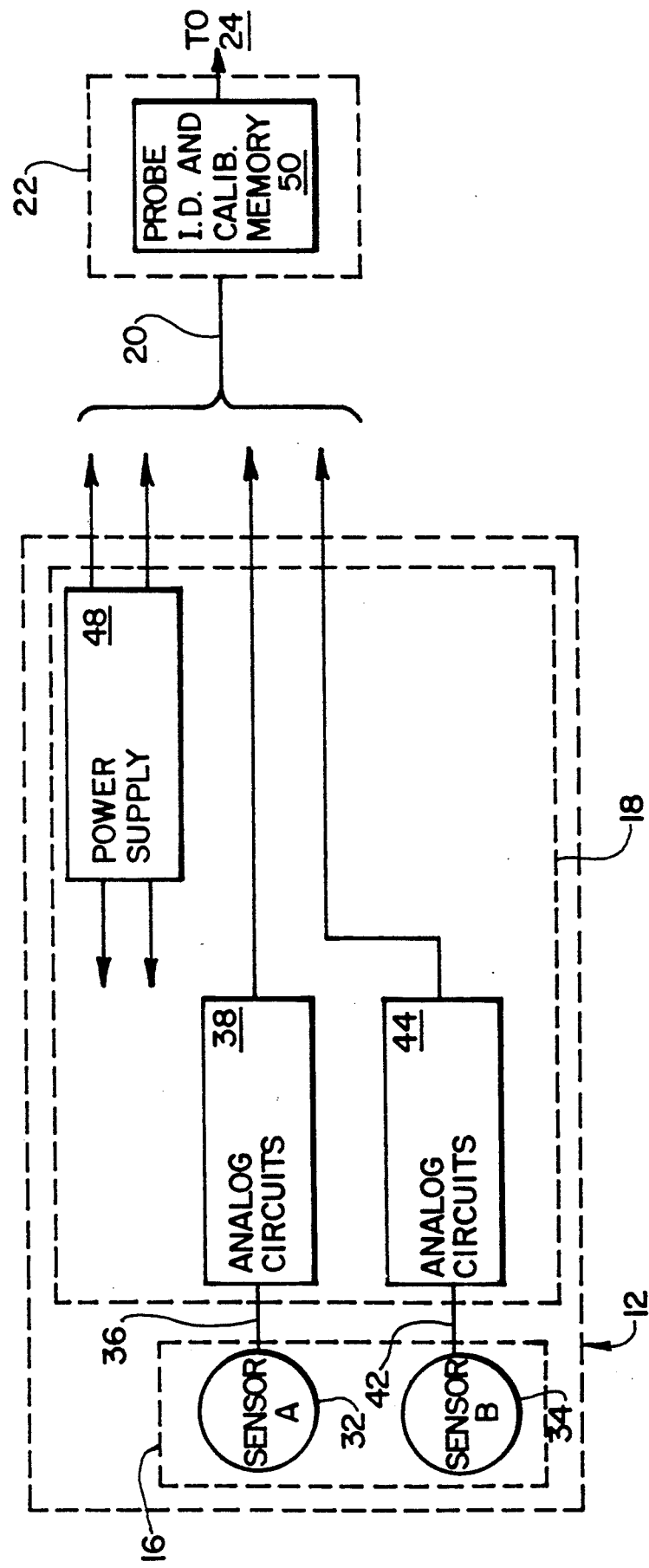
FIG. 5 is a schematic block diagram of another embodiment of the meter module of the present invention.

The probe module 12 can be any of a number of types of probe modules, which can sense or measure one or more physical parameters such as air velocity, volume flow, temperature or humidity. Each probe module 12 will include a probe 16 which will include one or more conventional sensors 32 as illustrated in FIG. 1. The be 16 an be a fixed probe or a telescoping probe, generally mounted in a probe handle 18. The probe handle 18 is in turn coupled to a flexible connecting cable 20, which terminates in a locking connector 22. As will be described hereinafter, the probe module 12 preferably includes the probe module calibration and identification information in the handle 18. Alternatively, the calibration and identification information can be stored in as illustrated in FIG. 5 the locking connector 22.

The meter module 14 includes a connector 24 which mates to the locking connector 22. When the meter module 14 is mated to the probe module 12, the meter module 14 reads the identification and calibration information from the probe module 12 and then is ready to display the sensed parameter on a display 26, preferably a liquid crystal display. The display 26 is mounted in a meter module case 28, which also contains the meter electronics and various switches as hereinafter described.

Figure 2:
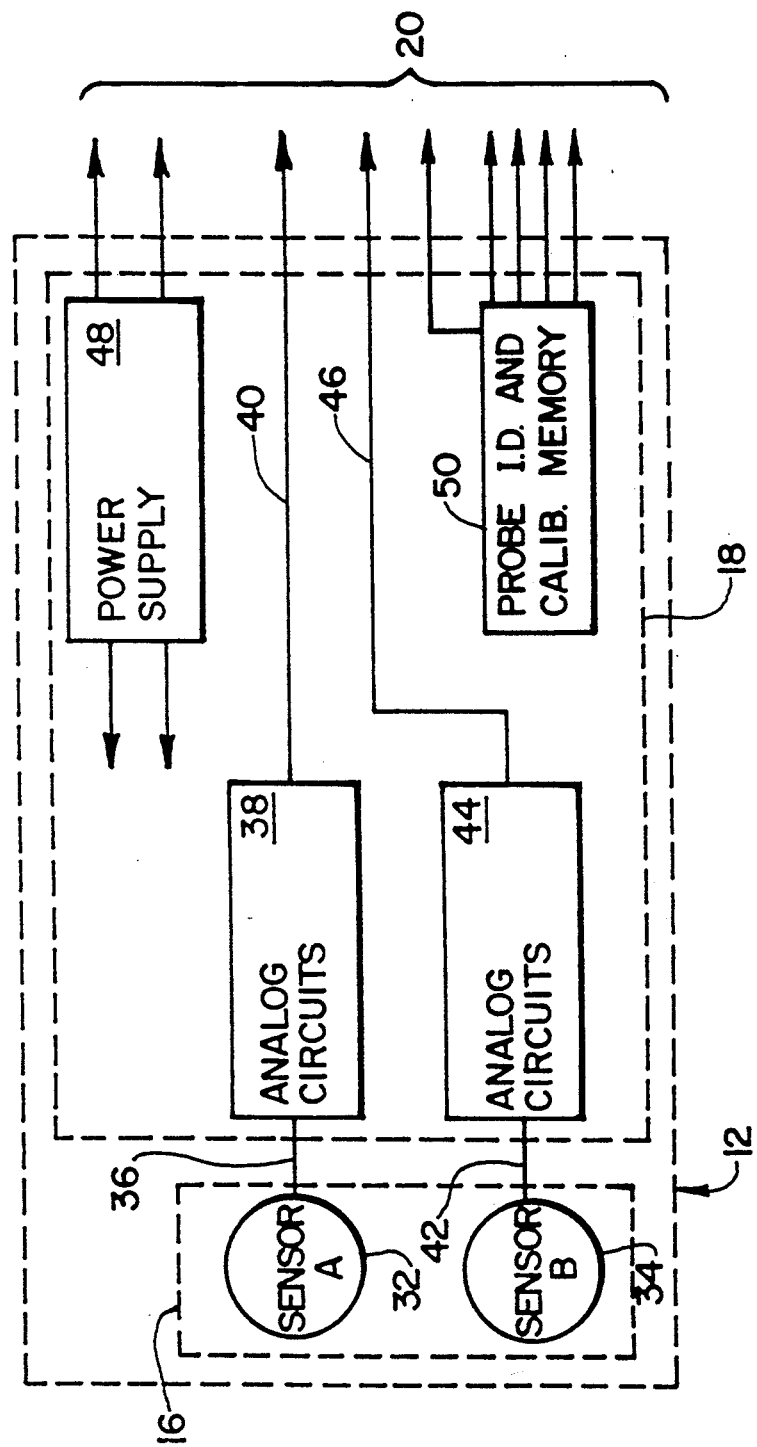
FIG. 2 is a schematic block diagram of a first sensing probe module embodiment of the present invention.

Referring to FIG. 2, a first embodiment of the probe module 12 is illustrated. The probe module 12 includes probe 16 having a pair of sensors 32 and 34, each preferably for sensing a different parameter or range of parameters. The sensor 32, for example a velocity sensor, is coupled by a lead 36 to an analog circuit 38 which develops a signal output indicative of the magnitude of the sensed parameter which then is coupled by a lead 40 to the cable 20 and hence to the meter module 14. In the same manner, the second sensor 34 is coupled by a lead 42 to an analog circuit 44 and then to a lead 46 to couple the signal generated to the meter module 14. The probe module 12 may include its own power supply 48, which could be eliminated with power supplied from the meter module 14.

Most importantly the probe module 12 includes an identification and calibration store or memory 50. The memory 50 includes the calibration information as well as a code identifying the probe module 12 to the meter module 14. The memory 50 also preferably includes the time constant setting and the units last displayed, as will be described hereinafter. This makes the various probe modules 12 interchangeable, since the meter module 14 interrogates the identification of the probe module 12 and also reads the individual calibration information from the memory 50.

The calibration information is stored in the form of a linearization algorithm to save memory space and allow the probe module 12 to be small and lightweight. One linearization algorithm which can be utilized is derived from the fact that one of the most important types of sensors for utilization in the probe module 12 is the thermal anemometer or hot wire. The general equation describing a hot wire comes from King's Law and is shown below in a simplified form:

$$(1) \quad volt^2 = A + B \times velocity^n$$

where A, B and n are determined by calibration and velocity is displayed. In order to use a general equation that will ensure a good linearization for any type of sensor, equation (1) is utilized in the following form:

$$\begin{aligned}(2) \quad volt^m &= A1 + B1 \times Display^{n1} \text{ for readings below } L \\ &= A2 + B2 \times Display^{n2} \text{ for readings above } L\end{aligned}$$

This is a two piece linearization scheme that requires six constants to be stored, namely A1, B1, n1, A2, B2 and n2. In addition, a seventh constant L, is needed to tell which of the two equation should be used. The value of m in equation 2 is stored to allow the equation to be used for other sensor types. For a thermal anemometer m=2, but would be set to 1 for a linear sensor such as a resistance temperature device (RTD). For an RTD, n1 and n2 would also be set to 1. Equation (2) then requires that eight constants be stored to linearize not only a thermal anemometer, but any general type sensor. The two piece linearization scheme allows maximum flexibility and accuracy. In terms of memory storage required, this is a superior method to a look up tale linearization scheme that wold require about 70 values to be stored to obtain the same degree of accuracy.

Figure 3:
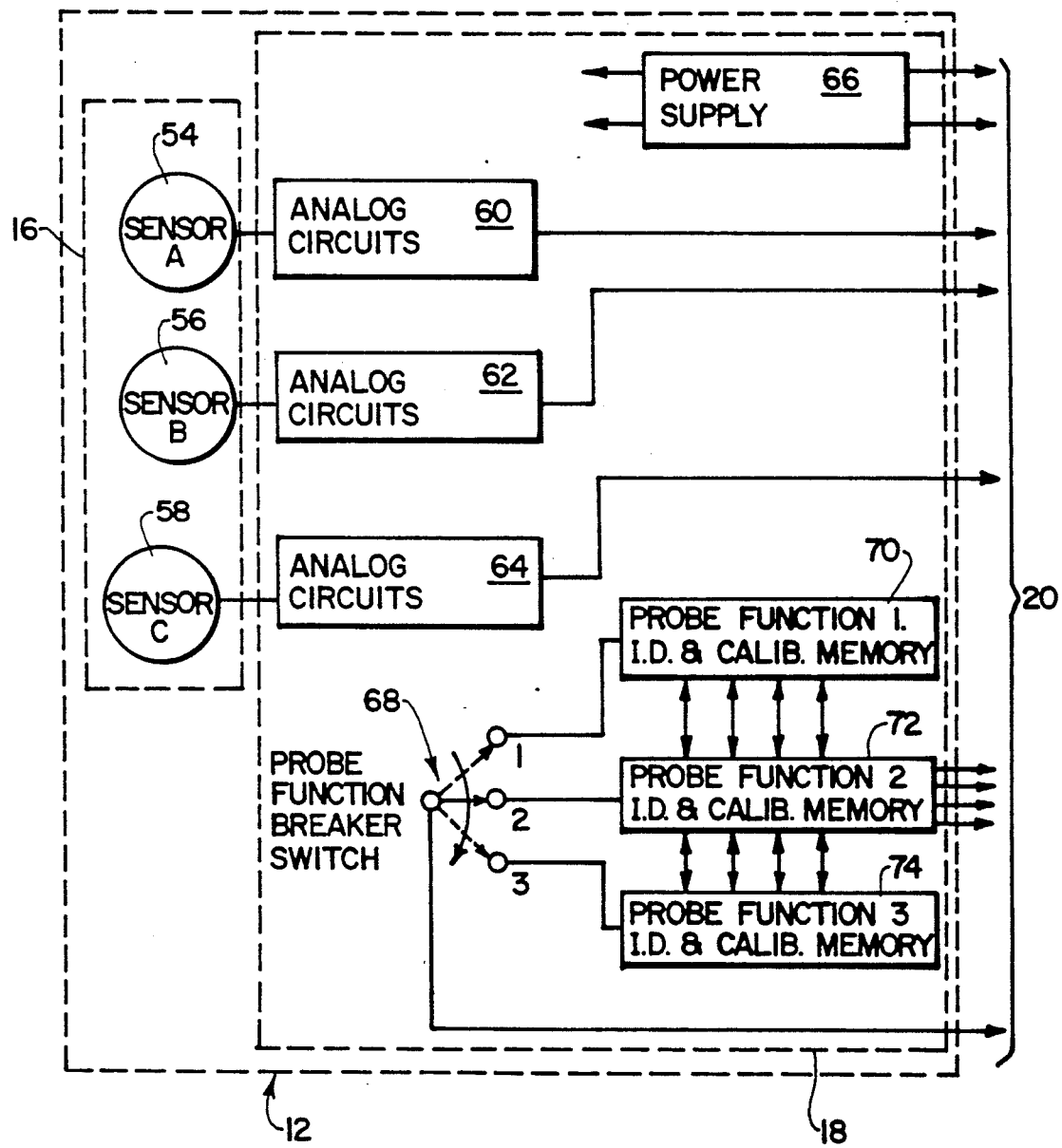
FIG. 3 is a schematic block diagram of a second sensing probe module embodiment of the present invention.

A second embodiment of the probe module 12 is illustrated in FIG. 3. The probe module 12 includes a probe 16 having three different sensors 54, 56 and 58 and their respective analog circuits 60, 62 and 64 coupled to the cable 20 as was described with respect to the probe module of the first embodiment. In addition to having a third sensor 58, the probe module 12 also includes a selector switch 68 which couples one of two or more calibration and identification information memories 70, 72 an 74 to the meter module 14. This allows at least one of the sensors 54, 56 and 58 to be utilized for different ranges or for different parameters, where applicable.

Figure 4:
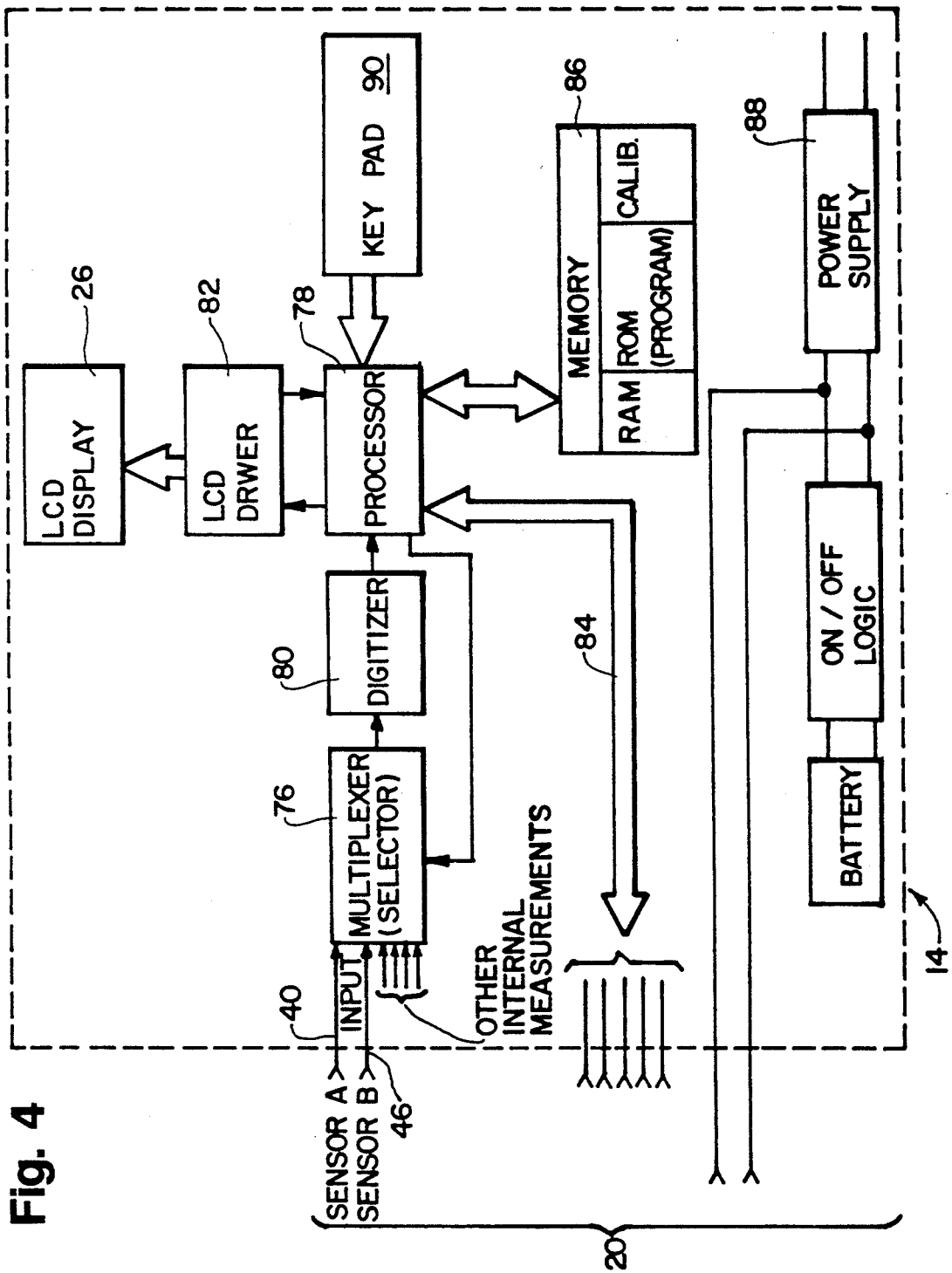
FIG. 4 is a schematic block diagram of one embodiment of the meter module of the present invention.

The information from the probe module 12 is coupled to the meter module 14, as illustrated in FIG. 4. Utilizing the probe module of the first embodiment as an example, the sensed signals on lines 40 and 46 are coupled to a multiplexer 76. The multiplexer 76 under control of a central processor or microprocessor 78 couples one of the signals from lead 40 of 46 to a digitizer 80. The digitized information is then coupled to the processor 78 where it is analyzed and converted to calibrated signals which then can be coupled to the LCD display 26 via an LCD display driver 82.

The processor 78 had previously interrogated the calibration and identification information memory 50 via a bus or set of lines 84. The calibration and identification information is retained in a memory 86 and utilized by the processor 78 as needed. The meter module 14 includes a power supply 88. The operation of the meter module 14 is controlled by a key pad 90, which can include one or more keys or can be one or more switches.

In operation of the modular metering instrument 10, a probe module 12 is selected and connected to the meter module 14 as illustrated in FIG. 1. The meter module 14 is turned on, following which the probe module 12 is identified by the meter module 14 and the identification code of the particular probe module 12 is displayed on the LCD display 26. Next, all the segments of the LCD display 26 are turned on to verify their operation. Then, the last set of units utilized with the probe module 12 are displayed. The time constant setting (display rate) is next displayed and then actual operating measurements are displayed.

Several menu options are programmed into the meter module 14 that are available for use with any probe module 12. The menu options allow the user to store new settings into the probe memory 50, or to display settings already stored in the probe memory 50. The menu options are:

A. Units
B. Time Constant
C. Show Calibration Constants for sensor 32
D. Show Calibration Constants for sensor 34
E. Change Calibration Constants for sensor 32
F. Change Calibration Constants for sensor 34

To enter the menu mode, the user must first remove a front display window cover from the meter module 14 (not illustrated). Once the cover is removed, the user has access to a pushbutton switch on the pad 90 located on the printed circuit board. While depressing this switch, the meter module 14 is turned on. To move through the various menu options, the pushbutton switch located on the printed circuit board is depressed and released. To select a menu item, a change switch located on the meter's front panel is depressed and released. The various menu options are described below.

A. Unit

Allows the user to define the set of units the meter will operate in. The units that are available are probe dependent. Units listed below can be eliminated from the display by the user if desired. The following units are programmed into the meter:

1. For a thermoanemometer probe module
   a. KPH Kilometer per hour
   b. FPn Feet per minute
   c. nPs Meters per second
   d. FPs Feet per second
   e. nPH Mile per hour
   f. C Celsius degrees
   g. F Fahrenheight degrees
2. For a relative humidity probe module
   a. Rh Relative humidity in %
   b. C Celsius degrees
   c. F Fahrenheight degrees
3. For a pressure probe module
   a. PA Pascals
   b. InH Inches of $H_2O$
   c. mmH Millimeters of $H_2O$
   d. KPH Kilometers per hour
   e. FPn Feet per minute
   f. nPs Meters per second g. FPs Feet per second
h. nPH Mile per hour
4. For a volume flow probe module
a. LPS Liters per second
b. CFn Cubic feet per minute
c. cnh Cubic meters per hour
d. C Celsius degrees
e. F Fahrenheight degrees
5. For any probe module that reads out in voltages only
a. Decimal point in the display can be placed as required.

B. Time Constant TC

There are seven possible time constant or integration levels that the user can choose from. The levels are identified by the numbers 1 through 7 on the display 26, as illustrated in Table 1. The instrument 10 responds fastest at the 1 setting, and slowest at the 7 setting. When the desired setting appears on the display 26, the change switch is depressed and then released. This setting is then stored in the probe memory 50.

TABLE 1

| LEVEL | AVERAGING SCHEME | % OVERRIDE DISPLAY |
|---|---|---|
| 1 | 100% new value, 0% old value | 0% |
| 2 | 75% new value, 25% old value | 25% |
| 3 | 50% new value, 50% old value | 50% |
| 4 | 25% new value, 75% old value | 75% |
| 5 | 10% new value, 90% old value | 90% |
| 6 | take 3 readings, display average | |
| 7 | take 5 readings, display average | |

C. Show Calibration Constants for sensor 32

The various calibration constants for sensor 32 of the probe module can be viewed on the display 26.

D. Show calibration Constants for sensor 34

The various calibration constants for sensor 34 of the probe module can be viewed on the display 26.

E. Change Calibration Constants for sensor 32

The meter module will allow the user to program multiplier factors in the range of 0.8 to 1.2.

F. Change Calibration Constants for sensor 34

The meter module will allow the user to program multiplier factors in the range of 0.9 to 1.1.

Calibration can be adjusted by applying a correction factor to the displayed output. This is a feature that is not generally found in thermal anemometer probes. Typically, calibration for probes of this type is done by adjusting a number of potentiometers. The invention provides an easy way to calibrate probe modules 12 of any kind. Because the corrections are done digitally, the calibration is inherently more stable than corrections made with potentiometers.

Modifications and variations of the present invention are possible in light of the above teachings. All the switches could be externally accessible. It is therefore to be understood that within the scope of the appended claims, the invention may be practiced otherwise than as specifically described.

What is claimed and desired to be secured by Letters Patent of the United States is:

1. A discrete probe (16, 18) for sensing at least one physical parameter, said probe comprising:
   means for sensing at least one of velocity, volume flow, temperature, pressure and humidity and generating a signal related thereto; p1 means for storing calibration and identification information in said probe; and
   means for coupling said calibration and identification information and said sensed signal for connection to a separation meter.

2. The probe as defined in claim 1 including means adapted to connect said means for coupling of said probe to said separate meter.

3. The probe as defined in claim 1 wherein said probe includes an elongate sensing stylet having first and second ends, said sensing means mounted on said first end of said stylet and a handle on said second end of said stylet and a flexible cable adapted to connect said probe to said separate meter.

4. The probe as defined in claim 3 including said storing means mounted in said stylet handle.

5. The probe as defined in claim 3 including a meter connector on a free end of said cable and said storing means mounted in said meter connector.

6. A probe for sensing at least one physical parameter, said probe comprising:
   a stylet having means for sensing at least one of velocity, volume flow, temperature, pressure and humidity and generating a signal related thereto, said stylet having said sensing means mounted on one end thereof and a handle on a second end thereof;
   means for storing calibration and identification information in said handle;
   means for coupling said calibration and identification information and said sensed signal in said stylet for connection to a separate meter; and
   means adapted to connect said means for coupling of said probe to said separate meter including a flexible cable adapted to connect said means for coupling of said probe to said separate meter.

7. The probe as defined in claim 6 wherein said stylet includes at least second means for sensing at least one physical parameter and generating a signal related thereto and at least second means for storing calibration and identification information in said handle relating to sensing at least a second physical parameter and means for sensing one of said calibration and identification information storing means.

8. The probe as defined in claim 6 including a meter connector on a free end of said cable and said storing means mounted in said meter connector.

9. A meter for utilization with a plurality of physical parameter sensing probes, said meter having calibration and identification information stored therein, said meter comprising:
   means for identifying a sensing probe to be connected to said meter;
   means for reading and storing calibration information read from the connected sensing probe; and
   means for analyzing the sensed physical parameter that is input by the connected sensing probe and calibrating the sensed physical parameter with said stored calibration information in said meter.

10. The meter as defined in claim 9 including means for switching between more than one physical parameter sensing probe input.

11. The meter as defined in claim 9 including means for displaying the calibrated sensed physical parameter.

12. The meter as defined in claim 9 including means for digitizing the sensed physical parameter and then coupling said digitized physical parameter to said analyzing means.

13. The meter as defined in claim 9 wherein said identifying means identify said connected sensing probe when it is connected to said meter module.

14. The meter as defined in claim 13 including means for switching between more than one physical parameter sensing probe input and means for digitizing the sensed physical parameter and then coupling said digitized physical parameter to said analyzing means.

15. The meter as defined in claim 14 including means for displaying the calibrated sensed physical parameter.

16. A modular metering instrument for sensing at least one physical parameter, said modular metering instrument comprising:

a meter and at least one probe;

said probe including means for sensing at least one physical parameter and generating a signal related thereto;

means for storing calibration and identification information in said probe;

means for coupling said calibration and identification information and said sensed physical parameter signal for connection to said meter;

said meter including means for identifying a probe to be connected to said meter;

means for storing calibration information read from the connected probe;

means for analyzing the sensed physical parameter that is input by the connected probe and calibrating the sensed physical parameter with said stored calibration information; and means adapted to connect said means for coupling of said probe to said meter.

17. The modular metering instrument as defined in claim 16 wherein said probe includes at least second means for sensing at least one physical parameter and generating a signal related thereto.

18. The module metering instrument as defined in claim 17 wherein said probe includes at least second means for storing calibration and identification information in said probe relating to sensing at least a second physical parameter and means for selecting one of said calibration and identification information storing means.

19. The modular metering instrument as defined in claim 16 wherein said probe includes a sensing stylet having said sensing means mounted on one end thereof and a handle on a second end thereof and a flexible cable adapted to connect said probe to said meter.

20. The modular metering instrument as defined in claim 19 wherein said probe includes said storing means mounted in said stylet handle.

21. The modular metering instrument as defined in claim 16 wherein said meter includes means for switching between more than one probe input.

22. The modular metering instrument as defined in claim 16 wherein said meter includes means for displaying the calibrated sensed physical parameter.

23. The modular metering instrument as defined in claim 16 wherein said meter includes means for digitizing the sensed physical parameter and then coupling said digitized physical parameter to said analyzing means.

24. The modular metering instrument as defined in claim 16 wherein said meter identifying means identifying said probe when it is connected to said meter.

25. The modular metering instrument as defined in claim 24 wherein said meter includes means for switching between more than one probe input and means for digitizing the sensed physical parameter and then coupling said digitized physical parameter to said analyzing means.

26. A discrete probe for sensing at least one physical parameter, said probe comprising:

first means for sensing at least one of velocity, volume flow, temperature, pressure and humidity and generating a first signal related thereto;

second means for sensing at least one of velocity, volume flow, temperature, pressure and humidity and generating a second signal related thereto;

means for storing calibration and identification information in said probe; and means for coupling said calibration and identification information and said first and second sensed signals for connection to a separate meter.

27. The probe as defined in claim 26 wherein said probe includes at least second means for storing calibration and identification information in said probe relating to sensing at least a second physical parameter and means for selecting one of said calibration and identification information storing means.

* * * * *

UNITED STATES PATENT AND TRADEMARK OFFICE
CERTIFICATE OF CORRECTION

PATENT NO. : 5,162,725

DATED : November 10, 1992

INVENTOR(S) : Price R. Hodson, James W. Oram and Paul F. Haake

It is certified that error appears in the above-identified patent and that said Letters Patent is hereby corrected as shown below:

Column 2, line 28, after "16" insert a comma (,);

line 29, change "be" to --probe--;

line 30, change "an" to --can--;

lines 37-38, change these lines to read --tion and identification information can be stored in the locking connector 22 as illustrated in Fig. 5.--;

Column 3, lines 24 and 25, move "(2)" from the end of line 24 to the beginning of line 25;

line 41, change "tale" to --table--;

line 52, change "an" to --and--;

Column 4, line 4, change the colon (:) to a period (.);

Column 5, line 36, change "calibration" to --Calibration--;

line 62, delete "(16, 18)";

UNITED STATES PATENT AND TRADEMARK OFFICE
CERTIFICATE OF CORRECTION

PATENT NO. : 5,162,725

DATED : November 10, 1992

INVENTOR(S) : Price R. Hodson, James W. Oram and Paul F. Haake

It is certified that error appears in the above-identified patent and that said Letters Patent is hereby corrected as shown below:

```
          lines 64-68, change these lines to read:

--means for sensing at least one of velocity,
          volume flow, temperature, pressure and humidity
          and generating a signal related thereto;
          means for storing calibration and identification
          information in said probe; and--

Column 6, line 3, change "separation" to --separate--;

line 40, change "sensing" to --selecting--;

Column 7, line 36, change "module" to --modular--;

Column 8, line 18, change "identifying" to --identify--.
```

Signed and Sealed this

Nineteenth Day of October, 1993

*Attest:*

BRUCE LEHMAN

*Attesting Officer*     *Commissioner of Patents and Trademarks*